United States Patent [19]
King

[11] Patent Number: 4,867,261
[45] Date of Patent: Sep. 19, 1989

[54] VEHICLE SPEED REGULATING SYSTEM

[75] Inventor: Lael D. King, Minneapolis, Minn.

[73] Assignee: Electronic Control Systems, Inc., Minneapolis, Minn.

[21] Appl. No.: 116,003

[22] Filed: Oct. 30, 1987

[51] Int. Cl.$^4$ ............................................. B60K 31/04
[52] U.S. Cl. ..................................... 180/179; 123/350
[58] Field of Search ............... 180/170, 178, 179, 174, 180/176, 177; 123/349, 350; 74/89, 89.15

[56] References Cited

U.S. PATENT DOCUMENTS

| | | | |
|---|---|---|---|
| 4,187,734 | 2/1986 | Mann | 74/405 |
| 4,569,239 | 2/1986 | Shirley et al. | 180/179 |
| 4,604,876 | 8/1986 | Sturdy | 123/361 |

OTHER PUBLICATIONS

Bendix Heavy Vehicle Systems Group, Excerpt from Service Data Brochure for SD-10-1 Cruise Control System, 3/81.
Econocruise Limited, Product Brochure, EMA Speed Control System from Econocruise.
Hewitt Industries, Product Brochure, Vehicle Speed Limiting.

Primary Examiner—Charles A. Marmor
Assistant Examiner—Richard Camby
Attorney, Agent, or Firm—Anthony G. Eggink

[57] ABSTRACT

A control system for use with the throttle linkage of a motor vehicle to regulate the speed of the motor vehicle at a predetermined level. The control system comprises a speed sensor communicatively connected to the motor vehicle which outputs signals which are a function of the speed of the motor vehicle. A control unit is connected to the speed sensor. The control unit receives the output signals from the speed sensor and has a control circuit for processing the output signals to provide electrical control signals and a drive mechanism responsive to the control signals. The control unit further comprises a linear actuator linked to the throttle by a cable. The linear actuator is communicatively connected to the throttle linkage so that the linear actuator moves the throttle to control the speed of the vehicle. The control system has a clutch connected to the control unit for engaging the drive mechanism with the linear actuator.

16 Claims, 5 Drawing Sheets

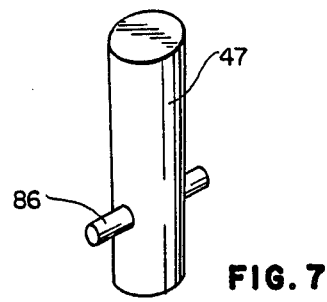
FIG. 7
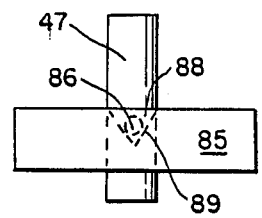
FIG. 8
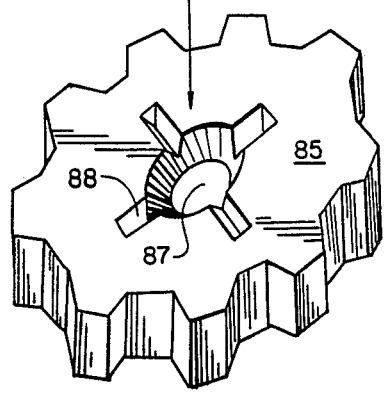

VEHICLE SPEED REGULATING SYSTEM

BACKGROUND OF THE INVENTION

This invention relates to control mechanisms for motor vehicle engine operation and more particularly to systems for regulating the speed of the motor vehicle. The device is particularly useful for controlling the operating speed of diesel engine powered motor vehicles at a preset value.

A speed control system or cruise control regulates the speed of a vehicle at a preset level which is determined by the operator based on the vehicle load, road conditions, and other factors. Speed control is typically accomplished by a fuel bypass, throttle linkage control means or engine oil pressure control means.

Cruise control systems are being used with increased frequency in the trucking industry by fleet owners and owner-operators for reasons of economy, comfort and safety. Automatic speed control reduces the amount of fuel consumption during vehicle operation. Speed control also minimizes overall vehicle maintenance and particularly that required by the engine. Further, speed control increases vehicle operating safety through improved adherence to posted speed limits. This is a particularly important result for buses and motor coaches. Additionally, through adherence to posted speed limits, speed control systems help to maintain good operator driving records. Finally, speed control systems provide added operator comfort and convenience through automatic maintenance of a preset speed.

Ideally, the speed control should accurately maintain the set speed without appreciable surge, overshoot and droop. The device should provide such speed maintenance in a fast, smooth and substantially imperceptable fashion. The device should also provide a safety disconnection mechanism during braking, gear shifting and in the event of a power failure or other system failure. Finally, the speed control device should have a compact and simple design so that it is easy to manufacture and install.

In the past, cruise control devices have been used and proposed to regulate the speed of motor vehicles, and some of the prior art devices are usable for diesel powered vehicles, including trucks. However, these devices are generally complex, difficult to construct and install, and are inefficient and often unsafe to use. Specifically, some prior art devices employ pneumatic systems utilizing either positive air pressure or a vacuum to control an actuator which is operative on a carburetor or fuel pump. These pneumatic systems are complex, difficult to install and often very expensive.

Some prior art devices are ineffective at maintaining the preset speed, particularly under windy weather conditions. These devices surge to maintain vehicle speed under windy conditions. Surge may also be caused by heavy loads, steep grades or fast acceleration. The surge phenomenon is both uncomfortable for the operator and unsafe. Other prior art devices provide slow, rough and inaccurate speed control which results in disconcerting speed variations. Such variations lead to operator dissatisfaction and rejection.

Other prior art devices are unsafe in that they do not provide a reliable, safety mechanism for disengagement of the speed control system upon deactivation by the driver, vehicle braking, gear shifting, electrical system failure and other emergencies.

Despite the need for a cruise control device in the art which provides efficient and reliable speed regulation for motor vehicles, particularly diesel powered vehicles, which is simple to manufacture, install and use, and which overcomes the limitations and problems of the prior art, none insofar as is known has been proposed or developed.

Accordingly, it is an object of the present invention to provide a speed control device which provides safe, reliable vehicle speed control under a variety of weather, load grade and acceleration conditions. It is a further object of the present invention to provide a speed control device which minimizes vehicle surge, particularly in high wind conditions. It is another object of this invention to provide a device which yields fast, smooth and substantially imperceptible speed control. Also, it is an object of this invention to provide a speed control system which is compact, unitary, uncomplicated, and which is easy to manufacture, install and maintain.

SUMMARY OF THE INVENTION

The present invention provides a speed control system for use with the fuel pump throttle of a motor vehicle and which regulates the speed of the motor vehicle at a predetermined level. The control system comprises a speed sensor communicatively connected to the motor vehicle which outputs variable signals which are a function of the speed of the motor vehicle. The control system has an operator control panel located in the vehicle cab which permits the driver to activate the speed control system and to select the speed of the vehicle. The operator control panel outputs a constant reference signal which is a function of the desired motor vehicle speed. The control system further comprises an actuation control unit (ACU) which is connected to the speed sensor and to the operator control panel to receive the output signals therefrom. The actuation control unit has a control circuit for processing the output signals, a drive mechanism which is responsive to the control circuit and an actuator. The drive mechanism is coupled to an actuator by a clutch mechanism. The actuator is connected to the linkage arm of the motor vehicle throttle by a cable so that the actuator linearly moves the linkage arm to provide increased or decreased throttle to the fuel pump or carburetor. The control system also comprises brake and clutch sensing switches disposed in the vehicle cab and connected to the control circuit of the actuation control unit. The brake/clutch sensing switches signal the clutch mechanism to terminate acceleration upon brake or clutch pedal depression by the operator.

The speed sensor comprises a magnetic reference means fixed to the motor vehicle drive shaft for rotation therewith, and stationary magnetic sensing means disposed adjacent to the reference means. The sensing means produces a variable output electrical signal, related to the rotational speed of the reference means, which represents the instantaneous vehicle speed. The operator control panel comprises an on/off switch, a speed selector and a resume switch. The control panel enables the operator to activate and deactivate the speed control system. It also provides a constant reference signal, set by the operator, which is representative of the desired vehicle speed.

The control circuit of the ACU compares the variable output signal from the speed sensor with the reference signal from the control panel to provide acceleration or deceleration actuating signals to the drive mechanism. The circuit also correlates feedback signals from the actuator to control the rate of actuation.

The drive mechanism of the ACU comprises a motor communicatively connected to the control circuit and controlled thereby, and a gearbox connected to the motor. The actuator of the ACU comprises a rotatable, disc-shaped cam member which has a shaft member. The shaft member is connectable to the gearbox of the drive mechanism. The actuator has a biased, rotatable reel assembly coupled to the cam member by a cable. The cable is connected to a predetermined point on the cam member, wound in the reel assembly and extends therefrom to the linkage arm. Rotation of the cam member causes the cable to be extended to or retracted from the reel assembly. The result and rotation of the reel assembly subsequently causes the cable to be extended or retracted between the reel assembly and the linkage arm.

The actuator has actuation feedback means which communicatively couples the cam member and reel assembly with the control circuit. The actuation feedback means provides information on the degree of cable extension or retraction to the control circuit. The actuation feedback means comprises a pair of limit switches disposed about the cam member and in mechanical contact therewith, and a potentiometer mounted on the rotatable shaft of the reel assembly. The degree of cable extension is related to the angular position of the predetermined point on the cam member and controlled by the actuation feedback means. The limit switches control the maximum and minimum amount of cable extension, while the reel assembly regulates cable extension thereinbetween.

An actuation shut-off mechanism is connected to the actuator to disengage it from the drive mechanism. The shut-off mechanism has a solenoid which is connected to the control circuit. A lever arm is connected to the solenoid and to the cam shaft which is vertically moveable. Engagement of the solenoid lowers the lever arm causing the cam shaft to mate with the gearbox. A spring is disposed between the cam and the gearbox so that the cam shaft disengages from the gearbox upon release of the solenoid.

These and other benefits of this invention will become clear from the following description by reference to the drawings.

BRIEF DESCRIPTION OF THE DRAWINGS

FIG. 7 is a perspective view of the cam shaft and gear arrangement of the actuation disengagement mechanism and shown separated for clarity;

FIG. 8 is a side view of the cam shaft and gear arrangement of the present invention in operative contact, also exhibiting the internal connection thereof;

DESCRIPTION OF THE PREFERRED EMBODIMENT

Figure 1:
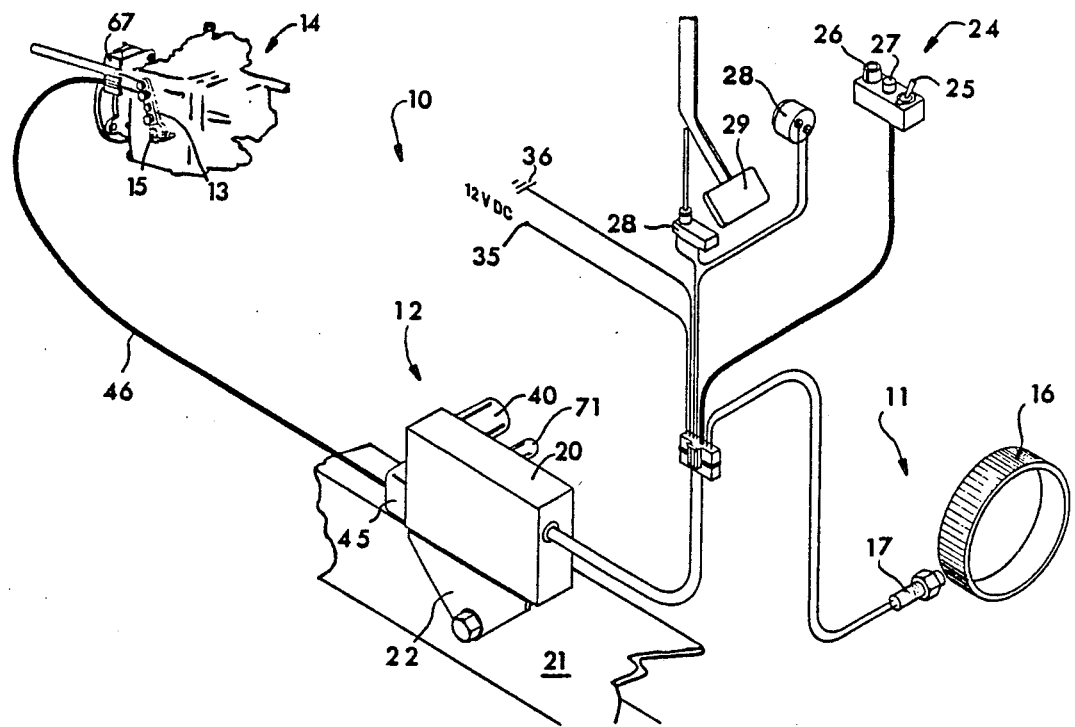
FIG. 1 is a perspective view of the vehicle speed regulating system of the present invention in operative connection with a motor vehicle.

FIG. 1 shows the vehicle speed regulating system 10 of the present invention. The system 10 comprises a speed sensor 11, an actuation control unit 12, an operator control switch panel 24, and a linkage arm 13. The system 10 is for use with the throttle 15 on the fuel pump 14 of a motor vehicle to regulate the speed of the motor vehicle at a predetermined level.

The speed sensor 11 outputs electrical signals which are a function of the speed of the vehicle. The speed sensor 11 comprises a magnetic reference collar 16 and a stationary magnetic sensor 17. The reference collar 16 is fastened and connected to the drive shaft of the motor vehicle so that it rotates therewith. The reference collar 16 is preferably a flexible strip having approximately forty (40) alternating magnetic sections or teeth of opposite polarity. The stationary magnetic sensor 17 is disposed adjacent to and aligned with the collar 16 at a distance of approximately $\frac{1}{8}$ inch. The sensor 17 has a steel, permanent magnet core approximately $\frac{1}{8}$ inch in diameter, which is wrapped by a wire winding. The stationary magnetic sensor 17 produces a variable reference output electrical signal the frequency of which is related to the rotational speed of the collar 16 and hence, the drive shaft. This speed sensor arrangement produces a 483 Hz signal at vehicle speed of 62 miles per hour on a vehicle having an engine speed to drive shaft speed ratio of 1:1±0.05. Alternatively, other speed sensor embodiments known in the art are usable with the system 10 of the present invention.

The operator control panel 24 is disposed in the vehicle cab at a location near to and accessible by the driver; for example, mounted on the gear shift mechanism. The control switch panel 24 has an on/off switch 25 for activating and deactivating the speed control system 10, a speed select control 26 and a resume switch 27. The speed select control 26 is preferably a 5 kilo-ohm variable potentiometer and is adjustable through a radius of 260 degrees by the operator to set a particular vehicle speed level. The control 26 provides a constant, electrical reference signal to the actuation control unit 12 which is correlated therein with variable reference signals received from the speed sensor 11.

Clutch/brake sensing switches 28 are also communicatively connected to the actuation control unit 12. Each clutch/brake sensing switch 28 is preferably a micro switch disposed adjacent to the clutch/brake pedal 29 so that it is activated upon depression of each pedal 29. Alternatively, the actuation control unit 12 may be connected to the brake light switch 28 of the vehicle to detect braking. The switch 28 provides a means of detecting gear shifting and braking by the operator so that the throttle actuation functions of the speed regulating system 10 may be disengaged.

Figure 2:
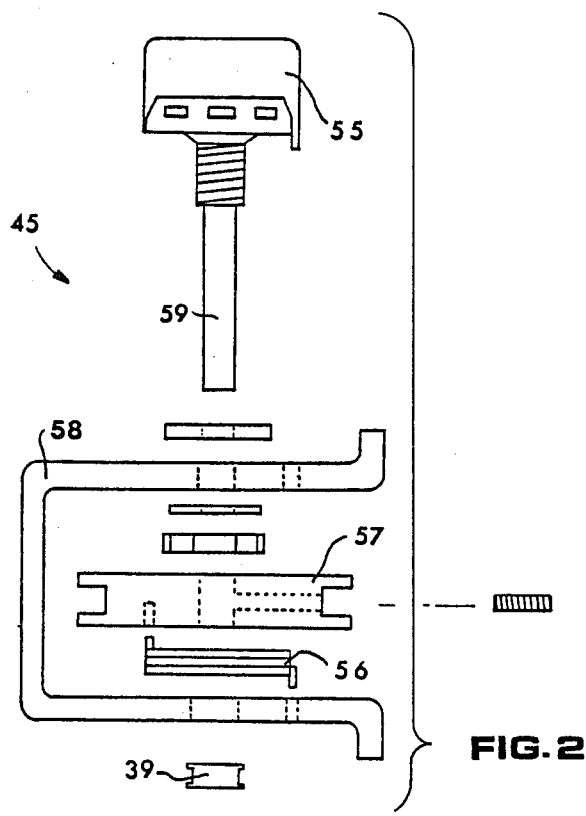
FIG. 2 is a lateral view of the reel assembly of the present invention with its components separated for clarity.
Figure 3:
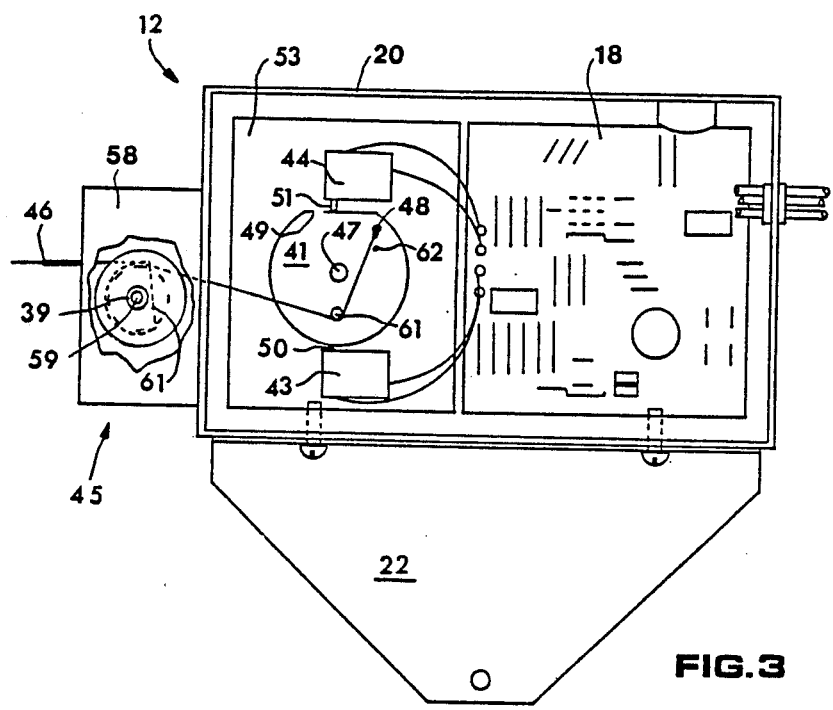
FIG. 3 is a top view of the actuation control unit with its housing opened to show its internal components and further showing the actuator cable in a fully retracted position for maximum throttle acceleration.
Figure 4:
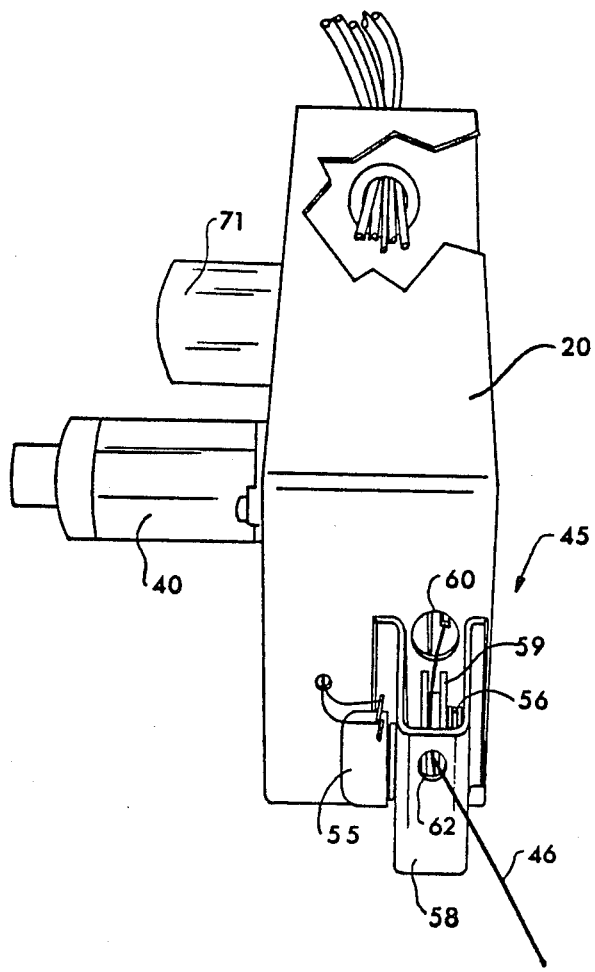
FIG. 4 is a side view in perspective of the actuation control unit.

The actuation control unit 12 is communicatively connected to the stationary magnetic sensor 17 of the speed sensor 11 and to the operator control switch 24 and receives electrical output signals therefrom. Referring also to FIGS. 2-4, the actuation control unit 12 has a control circuit 18 which processes electrical output signals from the speed sensor 11 and the operator control panel 24 to provide electrical control signals. The actuation control unit 12 also has a drive mechanism 23 (see FIG. 5) which is communicatively connected to the control circuit 18 and responsive to the electrical control signals, a linear actuator 19 (see also FIG. 5), and an actuation shut-off system 70 which engages the actuator 19 and the drive mechanism 23. The control unit 12 is preferably disposed in a sealed housing 20 which is attached to the motor vehicle frame 21 via a bracket 22. The housing 20 protects system components from the environment. Additionally, the housing 20 protects the components from unauthorized tampering.

Figure 9:
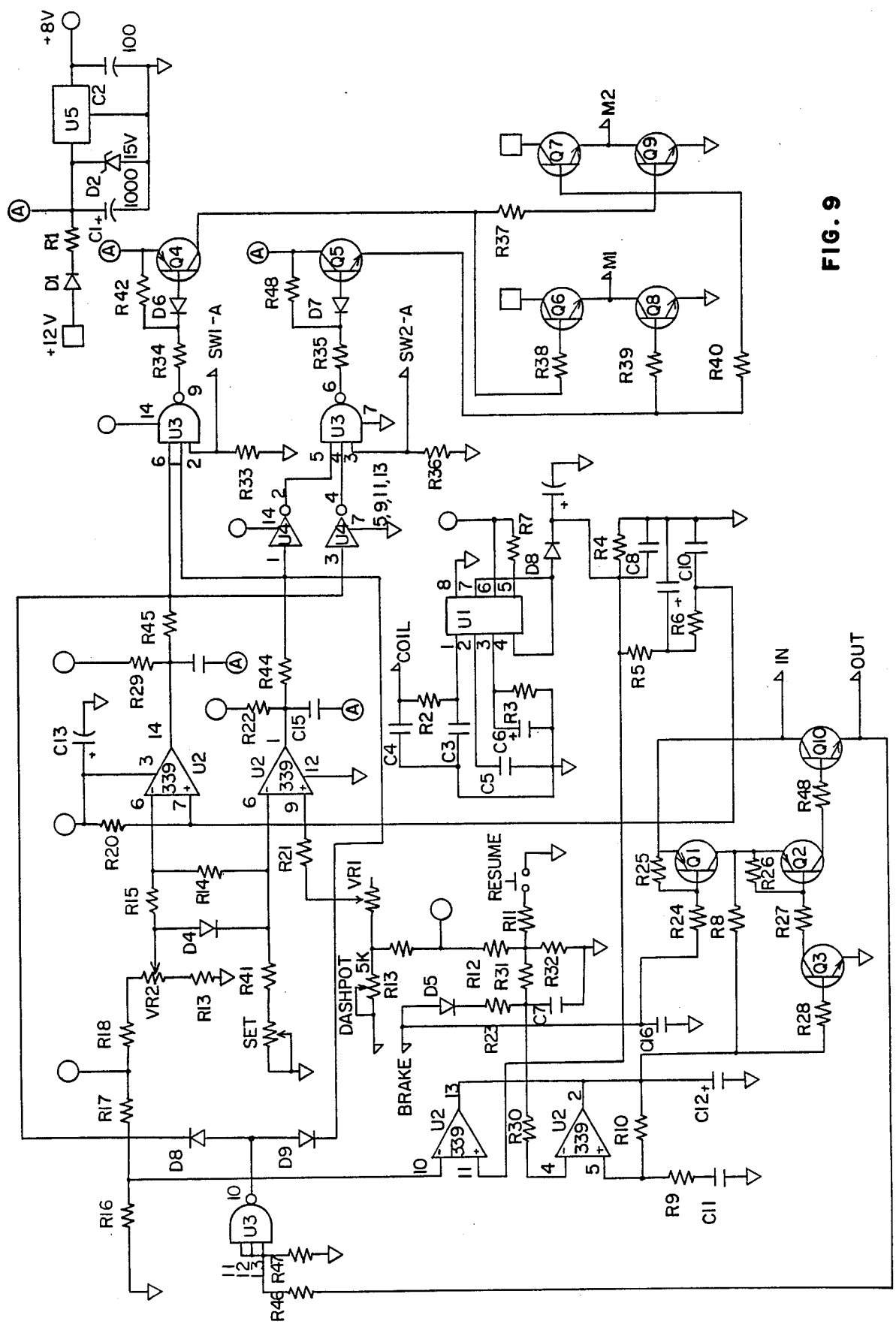
FIG. 9 is a schematic diagram of the circuitry in the control circuit of the present invention.
Figure 10:
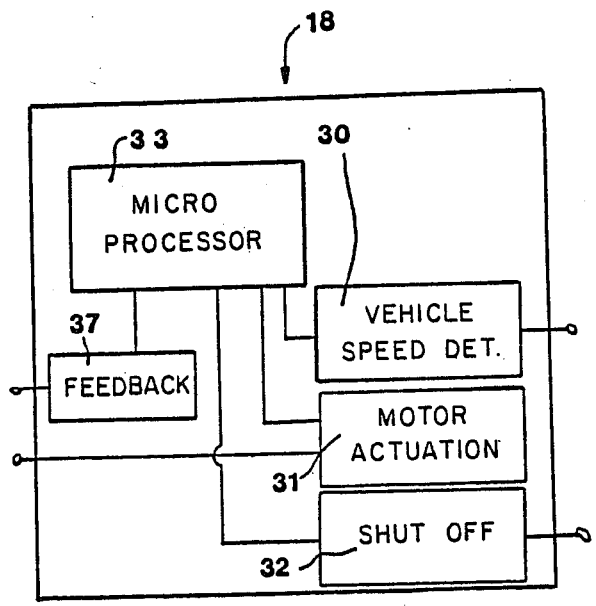
FIG. 10 is a diagram of the system components of the control circuit of the present invention.

Referring to FIGS. 9 and 10, the control circuit 18 comprises a vehicle speed determination system 30, a motor activation system 31, a clutch/brake detection system 32, an actuation feedback system 37, a microprocessor 33, a power supply connection 35 and a connection to ground 36. The microprocessor 33 has a memory and a stored program for program control of the microprocessor 33. The power supply connection and ground connection 36 are linked to respective complimentary vehicle power and ground systems. An adjustment switch 34 is connected to the control circuit 18 for selecting the maximum speed limit for the system 10. The control circuit 18 compares the variable output signal from the speed sensor 11 with the reference signal from the control panel 24 to provide acceleration or deceleration actuating signals to the drive mechanism 23. The control circuit 18 also correlates electrical signals from a feedback system (described below) to adjust the rate of acceleration or deceleration.

Figure 5:
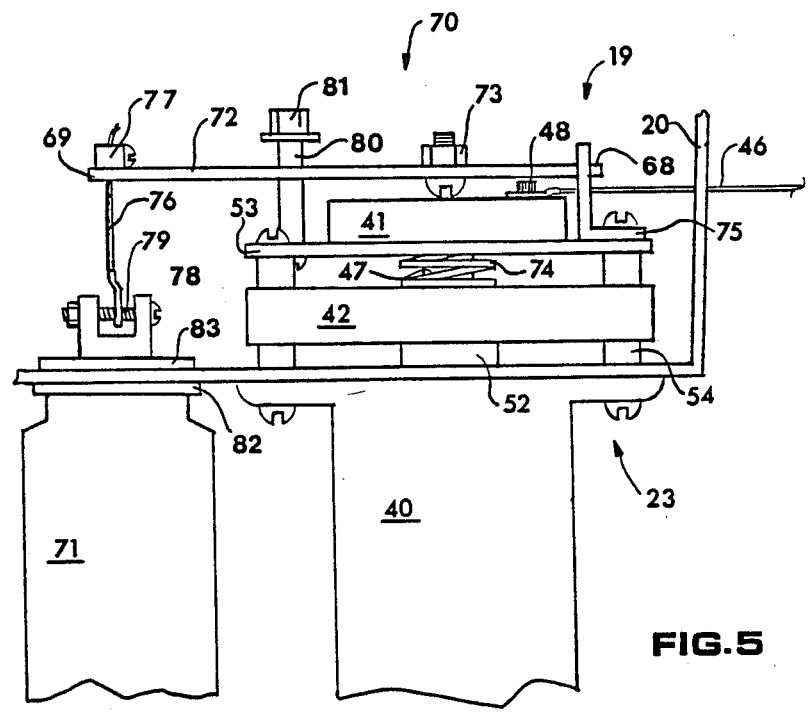
FIG. 5 is a front view of the actuation disengagement mechanism of the present invention shown in an engaged mode.

Referring to FIG. 5, the drive mechanism 23 comprises a motor 40, and a gearbox 42. The motor 40 is activated by current from the control circuit 18. The drive mechanism 23 is communicatively coupled to the linkage arm 13 via the actuator 19 and actuator cable 46 so that it linearly moves the linkage arm 13 in response to the electrical control of the control circuit 18.

The motor 40 is a 12 volt bi-directional, permanent magnet DC gearmotor of approximately 1/160 horsepower. Importantly, it has a speed in the range of 14 to 20 RPM. The gearbox 42 is connected to the motor 40 and driven thereby. The gearbox 42 preferably has a gear ratio of 135:1 for operation in the above-mentioned RPM range. Such a motor 40 and gearbox 42 are manufactured by Dayton Electric Manufacturing Co., Chicago, Ill.

The actuator 19 comprises a cam disc 41, first and second position sensing switches 43 and 44, a reel assembly 45 and an actuator cable 46. The cam disc 41 is a thin circular metal disc approximately 5 cm. in diameter. It has a single rectilinear portion 49 approximately 1.7 cm in length in its circumferential edge surface. The rotatable, cam disc 41 is connected to the gearbox 42 by an axially attached cam shaft 47 which extends from the cam disc 41. The cam disc 41 is rotated in a counter-clockwise direction for cable 46 retraction or acceleration and in a clockwise direction for deceleration. The cam disc 41 has a connection pin 48 disposed at a near-circumferential point on its outer face, approximately 2 cm. from its center. The cable 46 is pivotally attached to the connection pin 48. The connection pin 48 is preferably located on the top surface of the cam disc 41. The plane of the cam disc 41 is perpendicular to the axis of the shaft 47. Hence, rotation of the cam disc 41 causes the cable 46 to be extended or retracted in the same plane and generally in an arc from the center of the cam disc 41. The distance through which the cable 46 is extended or retracted by the cam disc 41 is referred to as the "throw" of the cable 46.

The first and second limit switches 43 and 44 are disposed adjacent to the circumferential edge of the cam disc 41 on opposite sides thereof so that they are aligned at a generally right angle to the direction of movement of the actuator cable 46. The switches are mounted on a base plate 53. Each switch 43 and 44 has a cam follower member 50 and 51 respectively, contacting the circumferential edge surface of the cam disc 41. The first and second limit switches 43 and 44 provide electrical limit signals to the control circuit 18 based on the angular position of the rectilinear portion 49 such that the connection pin 48 is rotatable through 180 degrees to fully extend and retract the attached actuation cable 46 through a distance or throw of approximately 4 cm. The control circuit 18 thereby determines whether the cable 46 is fully extended, fully retracted or thereinbetween based on the mechanical contact of the cam 41 with the limit switches 43 and 44.

The connection pin is preferably disposed adjacent to the trailing edge of the rectilinear portion 49 of the cam disc 41 on the top surface. As shown in FIG. 3, where the cam 41 is in the fully retracted or accelerated position with the rectilinear portion 49 in the 12 o'clock position, the connection pin 48 is located approximately at the 2 o'clock position. In its fully extended or decelerated position, the connection pin 48 is rotated to approximately the 8 o'clock position. A cable offset post 61 is disposed at the 6 o'clock position and engages the cable 46 to provide for cable retraction as the connection pin 48 rotates from a 3 o'clock position to its fully retracted position. The cable offset post 61 provides a tangential force, via the cable 46, on the cam 41 and prevents the cable 46 from becoming diametrically aligned with the cam 41. Additionally, a stop pin 62 is disposed in the cam 41 to provide a physical limit in acceleration. The stop pin 62 protrudes from the bottom surface of the cam 41 and engages a slot (not shown) in the base plate 53. The slot is coextensive with the arc through which the stop pin 62 travels upon rotation of the cam 41. The stop pin 62 and slot provide a physical barrier to rotation of the connection pin 48 beyond the fully retracted position.

The reel assembly 45 is mounted to the exterior of the housing 20 adjacent to the cam disc 41. The reel assembly 45 facilitates the linearity of retraction and extension of the actuator cable 46. The reel assembly 45 also provides feedback information to the control circuit 18 on the rate of cable 46 extension or retraction. The reel assembly 45 comprises a variable resistor or potentiometer 55, a biasing means 56, a cable pully 57 and a bracket 58. The bracket 58 is preferably mounted to the exterior of the housing 20. The cable pully 57 is disposed within the bracket 58 so that it is generally coplanar with cam disc 41. The diameter of the cable pully 57 is dependent on the throw of the cam disc 41 and the required linear movement of the cable 46. The cable pully 57 has a shaft 59 which is rotatably coupled with the bracket 58 at both ends by bushings 39. The variable resistor 55 is mounted on the exterior of the bracket 58 and axially attached to one end of the shaft 59 which is extended through one bushing 39. Rotation of the shaft 59 changes the resistance value of the variable resistor 55. The biasing means 56 is preferably a coiled spring disposed within the bracket 58 and concentrically around the shaft 59. The spring 56 is attached to the bracket 58 at one end and to one face of the cable pully 57 at its other end so that it produces a biasing force in the opposite direction of the rotation of the cable pully 57 from an initial position.

The actuator cable 46, being pivotally attached at one end to the cam disc 41, extends, without slack, through an aperture 60 in the housing 20 and to the cable pully 57. The cable 46 is coiled around the cable pully 57 and runs through an insertion slot 61 in the cable pully 57 to couple the cable 46 to the pully 57. The amount of cable 46 coiling and the alignment of the insertion slot are dependent upon the diameter of the cable pully 57 and the required linear movement of the cable 46. The coiled cable 46 extends tangentially from the cable pully 57 through an aperture 62 in the bracket 58. The bracket aperture 62 is on the side of the cable pully 57 that is generally opposite the housing aperture 60. The two apertures 60 and 62 are also generally aligned with one another.

In the initial position, wherein the cable 46 is fully extended, the connection pin 48 of the cam disc 41 is nearest the housing aperture 60. Retraction of the cable 46 through the housing aperture 60, via counterclockwise rotation of the cam disc 41 causes cable 46 to uncoil from the cable pully 57. This causes the cable pully 57 to rotate in a clockwise direction thus re-coiling the other end of the cable 46, which is retracted through the bracket aperture 62. Rotation of the cam disc 41 through 180 degrees causes the cable pully 57 to rotate a corresponding amount and yields a cable throw from the pully 57 of approximately 3 inches.

Angular movement of the cam disc 41 thus causes rotation of the cable pully 57 in the opposite direction and causes linear retraction or extension of the actuator cable 46 through the bracket aperture 62. The magnitude of cable retraction is controlled by the control circuit 18 based on the output signals from the speed sensor 11 and the speed select control 26. The rate of retraction or extension of the actuator cable 46 is controlled by the loop feedback system comprising the cooperating cable pully 57 and variable resistor 55.

The variable resistor 55 is also communicatively connected to the control circuit 18. It is preferably a 5 kilo-ohm, type AB, OHMITE (R) potentiometer. As noted above, the magnitude of cable movement is a function of the angular rotation of the cable pully 57. Because the potentiometer 55 is axially attached to the rotatable shaft 57 of the reel assembly 45, this relationship enables the actuation control unit 12 to correlate the changing resistance value of the potentiometer 55 with the rate of cable extension. This variable resistance value is transmitted to the control circuit 18 and is utilized as a reference to be compared with the reference signal from the speed select control 26 and the variable reference signal from the speed sensor 11.

Figure 6:
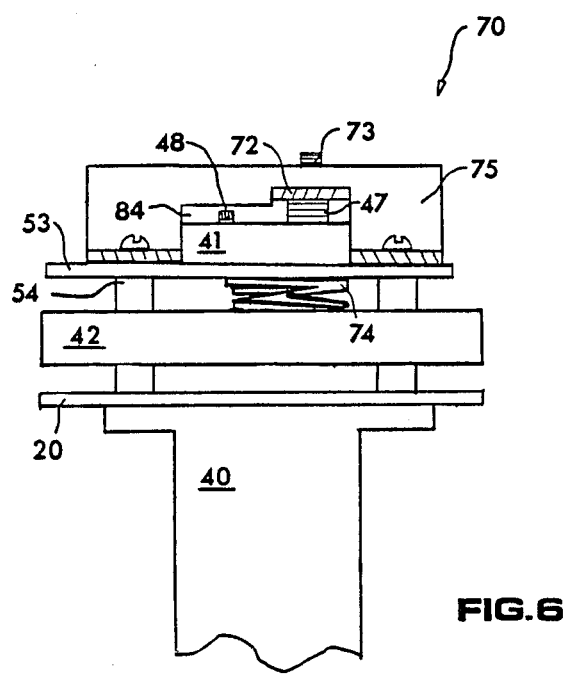
FIG. 6 is a side view of the actuation disengagement mechanism of the present invention.

Referring to FIGS. 5 and 6, an actuation shut-off system 70 provides a safety mechanism for quickly terminating vehicle acceleration during speed control system 10 operation. This system 70 disengages acceleration during braking or clutching, during a power failure or other failure in the system 10 and upon driver deactivation of the system 10. The actuation shut-off system 70 is operative on the cam disc shaft 47 to disengage the cam disc 41 from the gearbox 42, thereby terminating retraction of the actuator cable 46 and allowing the biased reel pully 57 to recoil to its initial, non-accelerating position.

The actuation shut-off system 70 is shown in connection with the other elements of the actuator 19 in an activated state. The position sensing switches are not shown for clarity. The system 70 comprises a solenoid 71, a lever arm 72, a connector nut assembly 73, a lever arm retainer 75, a guide post 80 and a deactivation or cam lifter spring 74. The solenoid 71 is connected to the exterior of the housing 20 by a collar 82 and a nut 83 and extends into the housing 20 through an aperture (not shown). The solenoid 71 is preferably a 12 volt, continuous duty solenoid. The solenoid 71 engages upon activation of the cruise control system 10 and disengages upon a failure in the system 10, power shut-off, braking, and clutching.

The lever arm or activation arm 72 is a rigid, elongated and rectangular metal plate which is connected to the cam disc shaft 47 by the connector nut assembly 73. The connector assembly 73 is attached to the lever arm 72 at a point approximately one third the distance from its first end 68. The first end 68 of the lever arm 72 extends through and is pivotally held in a stationary vertical position by the lever arm retainer 75. The lever arm retainer 75 is a rigid L-shaped bracket which is connected to the base plate 53 and which has an aperture 84 through which the lever arm 72 extends. The opposite or second end 69 of the lever arm 75 is coupled to the solenoid 71 via a retainer cable 76. The retainer cable 76 is attached, at one end, to the lever arm 72 by a clamp 77 and, at its other end, to the plunger 78 of the solenoid 71 by a connector member 79.

The cam lifter spring 74 is a coiled spring disposed vertically and axially around the cam disc shaft 47 in a space between the gearbox 42 and the base plate 53. It is seated on the upper face of the gearbox 42 and extends upwardly through the aperture (not shown) in the base plate 53 to contact the bottom surface of the cam disc 41. At all times, an upward force exerted by the cam lifter spring 74, on the lever arm 72, in combination with the restraining tension of the retainer cable 76 at the second end 69 of the lever arm 72 causes the first end 68 to be held in an upward position in the lever arm retainer 75.

The cam disc shaft 47 and attached cam disc 41 are vertically movable. Engagement of the solenoid 71 retracts the solenoid piston 78 thereby pulling the second end 69 of the lever arm 72 down. The downward force of the lever arm 72 pushes the cam disc 41 down via the connector nut assembly 73. In its lowered position, the cam disc 41 rests in a rotatable position above the base plate 53. The downard force of the lever arm 72 also lowers the cam shaft 47 through its aperture in the base plate 53 into engagement with the gearbox 42. The cam shaft 47 slides through bushings (not shown) disposed in the base plate 53 and gearbox 42. The downward force applied on the cam disc 41 during solenoid 71 engagement compresses the cam lifter spring 74. Disengagement of the solenoid 71 releases the piston 78 thereby allowing the second end 69 of the lever arm 72 to move vertically and releasing the downward force on the cam disc 41. The compressed cam lifter spring 74 then moves the cam disc 41 and the attached cam shaft 47 upwardly and out of the gearbox 42.

The guide post 80 is a rigid metal rod which is connected at its bottom end to the base plate 53. It extends vertically through an aperture in the lever arm 72 preferably between the midpoint and the second end 69. The guide post 80 has a terminal nut 81 disposed at its top. The guide post 80 prevents the lever arm 72 from moving laterally and further provides a stop to limit the upward movement of the lever arm 72 upon disengagement of the solenoid 71.

FIG. 7 shows the terminal gear 85 of the gearbox 42 and the bottom portion of the cam shaft 47. The vertically slidable cam shaft 47 has a horizontal rod member 86 which extends through the shaft 47 near its bottom. The rod member extends outwardly from two sides of the shaft 47. The terminal gear 85 has a hollow central bore 86 of a diameter equivalent to that of the shaft 47 and a plurality of V-shaped slots 88 which extend radially from the bore 86 on the top face of the gear 85. There are preferably four slots 88. Each slot 88 has a length equivalent to that of one extended portion of the rod member 86 and a depth sufficient to allow the rod member 86 to fully rest within the slot 88. The location of the rod member 86 with respect to the bottom of the shaft is dependent upon the width of the gear 85.

Referring to FIGS. 7 and 8, the cam shaft 47 is inserted into the bore 87 of the gear 85 upon engagement of the solenoid 71 via the above-described mechanism. Contemporaneous rotation of the terminal gear 85 (upon motor 40 activation) causes the slots 88 to become aligned with the rod members 86. The persistant downward force of the cam shaft 47 then causes the rod members 86 to mate with a pair of slots 88. Referring to FIG. 8, as the gear 85 rotates the trailing side wall 89 of the slot 88 engages the rod member 86 imparting a lateral force to it which causes the cam shaft 47 to rotate.

The angle of inclination of the trailing side wall 89 with respect to a line through the apex of the slot 88 is preferably about 15 degrees yielding a total V-shape configuration of about 30 degrees. This angle has been found to provide proper mating engagement of the rod member 86 with the slot 88 where lateral torque from the rotating gear 85 is combined with the downward pressure exerted on the cam shaft 47 and rod members 86 by the engaged solenoid 71. The 15 degree angle further provides reliable disengagement structure of the rod members 86 from the slots 88 upon release of the downward force from the cam shaft 47 due to disengagement of the solenoid 71. The inclined slope of the rotating trailing edge 89 acts to lift the rod member 86 out of the slot 88 and prevents wedging or jamming of the rod member 86 in the slot 88 due to the torque of the rotating gear 85. The cable offset post 61 provides a rotational force on the rod members through cable 46 tension from the bias spring 56 to further prevent jamming.

The actuator cable 46 extends from the actuator 19 as described above and to the vehicle throttle linkage 13. The portion of the cable 46 which extends between the reel assembly 45 and the linkage arm 13 is sheathed or jacketed in a manner known in the art. The linkage arm 13 is typically linked at one end to the rotatable throttle rod 15 of the carburetor 14. The actuator cable 46 is attached near the other end of the linkage arm 13 in a manner also known in the art. The point of attachment is dependent upon the rotation of the throttle rod 15 (which typically varies between 26-36 degrees) and the throw of the cable 46. Retraction of the cable 46 via the above-described mechanism applies an angular pulling force on the linkage arm 13 thus causing it to rotate the throttle rod 15 and accelerate the vehicle. Extension of the cable 46 allows the throttle rod 15 to rotate back to a decelerating or idling postion. A cable alignment bracket 67 is attached to the fuel pump 14 and has the actuator cable 46 extended through it to align the actuator cable 46 with the linkage arm 13.

As many changes are possible to the embodiments of this invention utilizing the teachings thereof, the descriptions above, and the accompanying drawings should be interpreted in the illustrative and not the limited sense.

That which is claimed is:

1. A throttle control system for use with a motor vehicle to regulate the motor vehicle speed comprising:
   a. speed set means to provide a predetermined load speed;
   b. sensing means to determine the speed of the motor vehicle;
   c. a control unit communicatively connected to said sensing means and to said speed set means for providing throttle control at said predetermined load speed, said control unit having drive means and a rotatable, radial actuator having means to determine the rate of rotation of said radial actuator;
   d. means for engaging said drive means with said actuator; and
   e. means to connect said radial actuator to the throttle of a motor vehicle, said connection means including a cable being radially and linearly movable by said radial actuator.

2. A control system for use with the throttle linkage of a motor vehicle, said control system regulating the speed of the motor vehicle at a predetermined level, comprising:
   a. an adjustment unit for setting the predetermined speed level, said adjustment unit outputting a signal which is a function of the predetermined speed level;
   b. a speed sensor communicatively connected to the motor vehicle and outputting signals which are a function of the instantaneous speed of the motor vehicle;
   c. a control unit connected to said speed sensor and to said adjustment unit, said control unit having a control circuit processing said output signals to provide control signals, a drive mechanism responsive to said control signals, and a rotatable, radial actuator having a vertically movable shaft and means to determine the rate of rotation of said actuator;
   d. means for engaging said drive mechanism with said actuator, said engagement means having a solenoid, leverage means vertically operative on said shaft and connected to said solenoid so that said leverage means brings said shaft into mating contact with said drive mechanism upon engagement of said solenoid, and a spring arranged so that it releases said mating contact between said shaft and said drive mechanism upon disengagement of said solenoid; and
   e. means to connect said actuator to the throttle linkage of a motor vehicle, said connection means including a cable being radially and linearly movable by said actuator.

3. The control system of claim 2, wherein said adjustment unit comprises an on/off switch, a resume switch and a speed selector.

4. The control system of claim 2, wherein said speed sensor comprises magnetic reference means fixed and connected for movement with the motor vehicle, and stationary magnetic sensing means disposed adjacent to said reference means at a predetermined distance therefrom, said sensing means producing an output signal related to the speed of said reference means.

5. The control system of claim 2, wherein said control circuit comprises vehicle speed determination means, motor control means, actuation feedback means, means to detect braking, clutching, and system activation, a microprocessor having a memory means and a stored program means for program control of said microprocessor, adjustment means and a power supply connection.

6. A control system of claim 2, wherein said drive mechanism comprises a motor communicatively connected to said control circuit and controlled thereby, and a gearbox connected to said motor.

7. The control system of claim 6, wherein said motor is a reversible 12 volt DC motor.

8. The control system of claim 6, wherein said motor has an operating speed in the range of 14 and 20 RPM and wherein said gearbox has a gear ratio of approximately 135:1.

9. The control system of claim 2, wherein said drive mechanism comprises a motor and a gearbox connected to said motor, said gearbox having a central bore and a plurality of V-shaped slots extending radially from said bore and wherein said shaft has a rod member, whereby said shaft mates with said central bore and said rod member mates with said slots upon engagement of said shaft with said gearbox.

10. The control system of claim 2, wherein said actuator comprises a rotatable, radial disc member connected to said shaft member and a rotatable reel assembly communicatively coupled to a predetermined point on said disc member by said cable, said cable extending from said reel assembly to the throttle linkage whereby rotation of said disc member causes rotation of said reel assembly and extension or retraction of said cable therefrom.

11. The control system of claim 10, wherein said reel assembly comprises a rotatably mounted cable pully having means to couple said cable and being coplanar with said disc member, means to bias the rotation of said cable pully, and a variable resistance means connected to said cable pully by a shaft and further being communicatively connected to said control circuit and providing information on the rate of extension and retraction of said cable.

12. The control system of claim 10, wherein said predetermined point is disposed on the top surface of said disc member, said disc member further having means disposed on the top surface of said disc member to offset said cable at an angle.

13. The control system of claim 10, wherein said disc member has at least one cam surface and wherein said actuator includes limit means comprising a first switch means mounted adjacent to said cam member and having a cam follower contacting said cam member and a second switch means mounted adjacent to said cam member at a location opposite said first switch means and having a cam follower contacting said cam member, said limit means being communicatively coupled to said control circuit and providing information on the magnitude of extension and retraction of said cable.

14. The control system of claim 13, wherein said disc member is constructed to provide three states of mechanical input to said limit sensing means through 180 degrees of angular rotation of said disc member.

15. The control system of claim 2, including means connected to said control circuit to detect clutch or brake operation on the motor vehicle.

16. A throttle control system for use with the throttle linkage of a motor vehicle, said control system regulating the speed of the motor vehicle at a predetermined level, comprising:
 a. a control panel for selecting the predetermined speed level said control panel outputting a reference electrical signal, which is a function of the predetermined speed level;
 b. a speed sensor communicatively connected to the motor vehicle and outputting electrical signals which are a function of the instantaneous speed of the motor vehicle;
 c. an actuation control unit connected to said speed sensor, said actuation control unit receiving said output signals from said speed sensor, said actuation control unit having a control circuit processing said output signals to provide electrical control signals, a drive mechanism having a motor communicatively connected to said control circuit and a gearbox connected to said motor, a rotatable cam member having a shaft member, limit means communicatively coupled to said cam member and to said control circuit, and a rotatable, biased reel assembly communicatively coupled to a predetermined point on said cam member by a cable and having a variable resistor connected so that rotation of said reel assembly changes the resistance value of said variable resistor, said variable resistor being connected to said control circuit, said cable extending from said reel assembly for connection to the throttle linkage;
 d. means for engaging said actuator with said drive mechanism, said engagement means having a solenoid, leverage means connected to said linear actuator and to said solenoid so that said leverage means brings said linear actuator into mating contact with said drive mechanism upon engagement of said solenoid, and means to release said mating contact upon disengagement of said solenoid.

* * * * *